(12) United States Patent
Krishnan et al.

(10) Patent No.: US 6,709,503 B1
(45) Date of Patent: Mar. 23, 2004

(54) WATERBASED HEATSET OFFSET INK COMPOSITIONS

(75) Inventors: Ramasamy Krishnan, Colonia, NJ (US); Marilyn Yamat, Bergenfield, NJ (US); Hugo Babij, Waldwick, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 10/323,284

(22) Filed: Dec. 19, 2002

(51) Int. Cl.[7] .......................... C09D 11/06; C09D 11/08
(52) U.S. Cl. ............................. 106/31.66; 106/31.73; 106/31.75; 106/31.86
(58) Field of Search .................... 106/31.66, 31.75, 106/31.73, 31.86

(56) References Cited

U.S. PATENT DOCUMENTS

| | | | |
|---|---|---|---|
| 3,356,030 A | 12/1967 | Greubel | 101/452 |
| 3,877,372 A | 4/1975 | Leeds | 101/465 |
| 4,079,026 A | 3/1978 | Mone | 260/22 CQ |
| 4,104,219 A | 8/1978 | Peters et al. | 260/29.6 RB |
| 4,173,554 A | 11/1979 | Sulzberg | 260/29.2 EP |
| 4,196,033 A * | 4/1980 | Arai et al. | 156/196 |
| 4,278,467 A | 7/1981 | Fadner | 106/2 |
| 4,419,132 A | 12/1983 | Moynihan | 106/27 |
| 4,543,102 A | 9/1985 | Defago et al. | 8/471 |
| 4,854,969 A | 8/1989 | Bassemir et al. | 106/2 |
| 4,903,599 A | 2/1990 | Kübler et al. | 101/450.1 |
| 4,908,063 A | 3/1990 | Baker et al. | 106/31 |
| 4,954,556 A | 9/1990 | Bull et al. | 524/378 |
| 5,039,339 A | 8/1991 | Phan et al. | 428/481 |
| 5,098,478 A | 3/1992 | Krishnan et al. | 106/23 |
| 5,167,704 A | 12/1992 | Brower | 106/28 R |
| 5,174,815 A | 12/1992 | Kondo et al. | 106/20 R |
| RE34,389 E | 9/1993 | Amon et al. | 106/30 B |
| 5,367,005 A | 11/1994 | Nachfolger | 523/403 |
| 5,370,906 A | 12/1994 | Dankert | 427/261 |
| 5,389,130 A | 2/1995 | Batlaw et al. | 106/20 R |
| 5,417,749 A | 5/1995 | Krishnan et al. | 106/20 R |
| 5,429,841 A | 7/1995 | Batlaw et al. | 427/288 |
| 5,462,768 A | 10/1995 | Adkins et al. | 427/265 |
| 5,573,578 A | 11/1996 | Okuda | 106/20 R |
| 5,694,848 A | 12/1997 | Palmatier | 101/219 |
| 5,725,646 A | 3/1998 | Krishnan et al. | 106/31.73 |
| 6,019,829 A * | 2/2000 | Omae et al. | 106/31.65 |
| 6,020,401 A | 2/2000 | Houser et al. | 523/161 |
| 6,444,021 B1 | 9/2002 | Weisbecker et al. | 106/31.66 |
| 6,444,022 B1 | 9/2002 | Krishnan et al. | 106/31.73 |
| 2002/0083865 A1 * | 7/2002 | Krishnan et al. | 106/31.6 |

FOREIGN PATENT DOCUMENTS

| | | | | |
|---|---|---|---|---|
| DE | 4119348 A1 | 12/1992 | | B41F/7/02 |
| EP | 0360212 A2 | 3/1990 | | C09D/11/02 |
| EP | 0473450 A2 | 4/1992 | | C08L/93/04 |
| JP | 8-169188 | 2/1996 | | B41M/7/00 |
| WO | WO 97/33750 A1 | 9/1997 | | B41F/13/22 |
| WO | WO 97/33757 A1 | 9/1997 | | B41M/1/08 |

OTHER PUBLICATIONS

Peters, Anton; Honen, Paul; Overbeek, Ad; Griffioen Sjaak; Annable, Tom, New Generation Waterborne Ink Binders For Packaging Films and Paper (Part I), American Ink Maker, Apr. 1999, pp 82–91.

Leach, R.H.; Pierce R.J.; Hickman E.P.; Mackenzie M.J.; Smith, H.G.; Editors); Inks and Varnishes for Specific Purposes, The Printing Ink Manual, 5th Edition, pp 571–576, 1993, no month available.

\* cited by examiner

*Primary Examiner*—Mark L. Bell
*Assistant Examiner*—Veronica F. Faison
(74) *Attorney, Agent, or Firm*—Sidney Persley

(57) ABSTRACT

A waterbased heatset offset lithographic ink comprising water, polyamide resins or fumarated rosin resins, hydroxyethylethylene urea, a modified linseed oil, a dibutylated benzoguanamine, a pigment and p-toluene sulfonic acid.

19 Claims, No Drawings

WATERBASED HEATSET OFFSET INK COMPOSITIONS

FIELD OF THE INVENTION

The invention relates to water based ink compositions for use in heat set/offset lithographic printing processes.

BACKGROUND OF THE INVENTION

The heat set printing process was first introduced in the 1950's and is now well established in the printing industry for the production of magazines, catalogues and brochures. The process yields high gloss, high quality prints and involves oven drying of the printed product.

In high speed web-offset printing presses, ink is applied to both surfaces of the web substrate simultaneously. To dry the ink before the substrate contacts a solid surface, the printed or coated web is passed through a float or floater type oven under tension and floated between cushions of hot air. Upon leaving the oven, the web must be cooled before further processing, such as sheeting, folding, or rewinding. Thus, the web is passed over one or more chill drums or rolls, i.e., internally cooled drums which reduce the web temperature from about 93° C. to about 32° C. Thus, heat set inks must fulfill exacting criteria to meet the high speed of press runs, the oven drying and required subsequent chilling and still meet the print quality standards. Further discussion of heat set inks and the heat set printing process can be found at *The Printing Ink Manual*, edited by R. H. Leach and R. J. Pierce, paces 571–576, 5th edition, (Blueprint, 1993).

Generally, lithographic heat-set/offset printing inks predominantly contain petroleum distillates. The fountain solutions typically contain a desensitizer, salts, and glycols. The use of water based inks allows the printer to avoid many of these volatile organic components ("VOCs") and their byproducts but requires additional equipment such as a humidity control chamber.

The offset lithographic printing process has always presented a unique challenge to ink formulators since the process utilizes a plan ographic printing plate, i.e. the image and non-image areas are in the same plane on the image carrier, and two fluids are concurrently utilized as discussed above. Water based inks have been developed, but remain slow drying and high in tack.

U.S. Pat. No. 5,725,646, which is incorporated herein by reference, describes a way of stabilizing a water based offset ink composition without drying up on a conventional multiple roller ink train using use a re-wetting agent, namely hydroxyethylethylene urea ("HEEU"). Since this re-wetting agent does not dry, it remains in the final film making it susceptible to poor water resistance. High levels of VOCs emanating from the oil-based ink and the aqueous fountain solution were reduced as was the difficulty in controlling the ink/water balance, while preserving the principal advantage of the conventional lithographic printing process, i.e. high surface energy differential between the image and non-image areas of the printing plate. However, the use of conventional re-wetting agents, such as glycols and glycol ethers not only imparts poor water resistance to the final film, but also increases the tack of the formulations, thereby limiting its use on high speed presses.

U.S. Pat. No. 6,444,021, which is incorporated by reference, describes a newspaper ink composition containing a humectant and a modified soybean oil based resin so as to eliminate the need for the humidity control (chamber) associated with water based inks while allowing the use of existing, multiple roller press set-ups. Drying problems remained however as the humectant takes longer to dry once the ink has printed on coated papers.

U.S. Pat. No. 6,444,022 B1 which is incorporated by reference, describes a modified linseed oil reacted with polyglycols. In this manner, the benefits of including HEEU in the composition could be obtained without sacrificing risking water washability. However, dry times remain higher than required for heatset/offset printing.

Thus, there exists a need for a heatset/offset printing ink which can be printed at high speed and dry quicker than the prior art referenced above while still maintaining low tack for ink transfer and water resistance after printing.

SUMMARY OF THE INVENTION

It is an object of the present invention to describe heat set ink compositions which preserve the advantages of current water based ink systems containing HEEU, such as elimination of VOCs in the pressroom, while also eliminating the need for a humidity chamber in a manner which does not rely upon modified soybean oil based resin. It is an additional object of this invention to allow the continued use of existing conventional multiple roller printing systems.

A water based heat set offset lithographic ink composition according to the present invention comprises: (a) water; (b) fumarated rosin resins; (c) a modified linseed oil; (d) hydroxyethylethylene urea; (e) a dibutylated benzoguanamine; (f) p-toluene sulfonic acid (PTSA); and (g) pigment. The present invention is also directed to a waterbased heatset offset lithographic ink composition comprising: (a) water; (b) polyamide resins; (c) hydroxyethylethylene urea; (d) a modified linseed oil; (e) a dibutylated benzoguanamine; and (f) pigment.

DETAILED DESCRIPTION OF THE INVENTION

It has been found that the use of hydroxyethylethylene urea in conjunction with benzoguanamine resin or with certain polyamide resins allows the formulation of a water based heatset lithographic ink which can be used in existing conventional multiple roller systems without the aid of a humidity chamber. Once printed, the ink has excellent rub and water resistance.

Water

The water based printing inks of the present invention contain water to act as a rheology and/or a surface energy modifier of the ink composition and to enhance the water washability of the ink. The water may be an added component or be contributed by one of the other components of the composition such as residual water from a pigment flush or press cake.

Resins for Pigment Bonding

The fumarated rosin resin in the present invention is a binder bonded to a pigment. Suggested binders to which the selected pigment may be bonded include, but are not limited to, water-soluble polyamide resins, rosin resins, rosin salts, tall oil resins, methacrylic resins, styrene-acrylic resins, polystyrenesulfonic acid and its salts, and acrylic or vinyl emulsion polymers prepared from monomers selected from the group consisting of acrylic acid esters, methacrylic acid esters, acrylic acid esters of polyhydric alcohols, methyl methacrylate, styrene, vinyl styrene, and vinyl acetate, and mixtures thereof. Particularly preferred binders are polyamide resins specially developed for use in graphic arts compositions, such as those resins sold under the trademark GAX™ such as GAX™ 12-513, available from FitzChem Corporation, Elmhurst, Ill., U.S.A., and fumarated rosin resins, available from Akzo Nobel Chemicals, Inc., Chicago, Ill.

Rewetting Agent

The composition of the present invention includes hydroxyethyl ethylene urea as a rewetting agent. The hydroxyethylethylene urea (HEEU) improves flow and increases open time on the rollers. While not wishing to be bound by theory, it is believed that the HEEU rewetting agent serves as a plasticizer by providing surface continuity to the dry film on the substrate.

Modified Linseed Oil

The invention includes a modified linseed oil to address problems otherwise associated with the inclusion of HEEU such as poor water resistance. The modified linseed oil also helps to reduce the ink's tack. The modified linseed oil according to the present invention comprises the reaction product of polyglycol and linseed oil.

The modified linseed oil according to the present invention may also include lithium ricinoleate, phthalic anhydride and triphenyl phosphate. Preferred modified linseed oils include DV 1469, manufactured by Reichold Inc., Durham, N.C.

Dibutylated Benzoguanamine

The composition of the invention includes dibutylated benzoguanamine. The dibutylated benzoguanamine of the invention crosslinks with HEEU. The dibutylated benzoguanamine. The presence of water prevents this crosslinking reaction when the ink is being transferred.

Preferred dibutylated benzoguanamine includes but is not limited to Watersol CPC 248, manufactured by Dainippon Ink and Chemical Corp of Japan.

P-Toluene Sulfonic Acid Catalyst

The composition of the invention includes p-toluene sulfonic acid to catalyze the reaction between the HEEU and dibutylated benzoguanamine.

Pigment

The pigment may be any of those which are suitable for formulating offset lithographic printing inks such as dry powder, flush, presscake or pigment dispersions. Such pigments include CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

In general, it is preferred that the ratio of pigment to fumarated rosin resin binder is in the range of about 1parts pigment to about 2 parts fumarated rosin resin binder (1:2). It is preferred that the ratio be about 1 parts pigment to about 1 parts fumarated rosin resin binder (1:1). A person of ordinary skill in the art will recognize that the amount of fumarated rosin resin-bonded pigment present in the ink composition of the present invention will vary, depending on several factors, including the ratio of pigment to fumarated rosin resin binder, other components to be present in a specific ink composition and the desired opacity of the end product. However, particularly when the pigment: binder ratio is approximately 1:1, it is contemplated that the resin-bonded pigment is present in an amount of about 10–60 wt % of the composition. It is preferred that the fumarated rosin resin-bonded pigment is present in an a amount of about 25–50 wt. % of the composition.

Printing Ink

In the water based heat set/offset lithographic ink of the present invention, the water is present in amounts of about 5 wt. % to about 35 wt. % and more preferably in an amount of about 5 wt % to about 15 wt. %. The resin bonded pigment may be present in the amount of about 35 wt. % and more preferably in an amount of about 25 wt % to about 50 wt. %. The modified linseed oil is present in amounts of about 5 wt. % to 30 wt. % and more preferably in an amount of about 10 wt % to about 20 wt. %. The hydroxyethylethylene urea is present in amounts of about 5 wt. % to about 20 wt. % and more preferably in an amount of about 10 wt % to about 20 wt. %. The dibutylated benzoguanamine is present in amounts of about 5 wt. % to about 20 wt. % and more preferably in an amount of about 10 wt % to about 20 wt. %. The p-toluene sulfonic acid is present in an amount of about 1 wt. % to about 5 wt. % and more preferably in an amount of about 1 wt % to about 2 wt. %.

Printing plates for use with the printing ink of the present invention should have image areas hydrophilic in nature with non-image areas hydrophobic in nature. An example of a suitable printing plate is the "waterless" Toray type. However, the image area of the plate need not contain a photo polymer. The image area of the plate may comprise, e.g. a grained aluminum surface which has no coating thereon, but is hydrophilic in nature. While the non-image area of the plate must be hydrophobic in nature, it may merely be covered with any type of hydrophobic material, provided that such hydrophobic material adheres to the non-image area of the plate during the printing process.

Water based metal driers may also be used in printing inks of the present invention. Previously, such driers could not be added because they would destabilize the water based ink system. In the composition presented here, the ink remains stable in the presence of such driers due to the presence of amine and water.

The water washable ink compositions of the present invention are further illustrated by the following non-limiting examples in which all parts and percentages of components are by weight and based on the total weight of the composition, unless otherwise indicated.

EXAMPLE 1

A water based heat set/offset printing ink was prepared from the components indicated below:

TABLE I

| Component | |
|---|---|
| Water | 21 |
| Fumarated Rosin Resins (Akzo515) | 12.5 |
| Hydroxyethylethylene urea | 12 |
| Modified linseed oil (DV-1469) | 20 |
| Dibutylated benzoguanamine (Watersol CPC 248) | 20 |
| p-Toluene sulfonic acid (PTSA) | 2 |
| Pigment | 12.5 |
| TOTAL | 100 |

The fumarated rosin resins were bonded to the dry pigment at a ratio of 1:1. This resin bonded pigment constituted 25% of the ink formulation. The ink had a pigment binder ratio of 1:15.

EXAMPLE 2

The ink in Example 1 was measured for tack and stability. The tack was measured using an inkometer (manufactured by Thwing Albert ) operating at a speed of 1200 rpm at 90° F. A tack of 17–20 was observed. Further, the ink was observed to be stable for 10 minutes in the inkometer.

EXAMPLE 3

A cyan ink for four color process heat set printing was formulated using the ink formula of Example 1. The cyan ink was run on a Diddle web press at 1,000 fpm and printed on a 40# coated paper. No ink build up on the rollers, plate, or blanket was observed. At a 1.33 observed density, the ink was dry at a 265° F. web exit temperature. The ink therefore dried as good as an oil based ink.

EXAMPLE 4

The print obtained from Example 3 was allowed to age for twelve hours. The print resisted 20 rubs by the Sutherland rub tester. One drop of water was placed on the dried print for 5 minutes and no ink dissolved in the water.

EXAMPLE 5

A waterbased ink was prepared from the components indicated below:

TABLE II

| Component | |
|---|---|
| Water | 15 |
| Polyamide Resins (GAX 12-513 and GAX II-966) | 12.5 |
| Hydroxyethylethylene urea | 20 |
| Modified linseed oil (DV-1469) | 20 |
| Dibutylated benzoguanamine (Watersol CPC 248) | 20 |
| Pigment | 12.5 |
| TOTAL | 100 |

The polyamide resins were bonded to the dry pigment at a ratio of 1:1. The fumerated rosin resin bonded pigment constituted 25% of the ink formulation. The ink had a pigment binder ratio of 1:15.

EXAMPLE 6

The ink in Example 5 was measured for tack and stability. The tack was measured using an inkometer (manufactured by Thwing Albert) operating at a speed of 1200 rpm at 90° F. A tack of 15–20 was observed.

EXAMPLE 7

The ink of Example 6 was run on a Didde web press at 1000 fpm and printed on a 40#coated substrate. At a 1.33 density, the ink dried in one (1) minute at 130° C. The ink therefore dried as well as a conventional ink containing petroleum distillates.

EXAMPLE 8

The print obtained from Example 7 was allowed to age for 8 hours. The print resisted 20 rubs with a Sutherland rub tester. One drop of water was placed on the dried print for 5 minutes and no ink dissolved in the water.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A water based heat set/offset lithographic printing ink comprising:
 (a) water;
 (b) fumarated rosin resins;
 (c) hydroxyethylethylene urea;
 (d) a modified linseed oil;
 (e) a dibutylated benzoguanamine;
 (f) p-toluene sulfonic acid; and
 (g) pigment.

2. The ink of claim 1 wherein the amount of water present is 5 to 35 wt. %.

3. The ink of claim 1 wherein the fumarated rosin resins are bonded to the dry pigment at a ratio of 1:1.

4. The ink of claim 1 wherein the amount of fumarated rosin resin bonded pigment present is about 25 wt. %.

5. The ink of claim 1 wherein the amount of hydroxyethylethylene urea present is about 5 to about 30 wt. %.

6. The ink of claim 1 wherein the amount of modified linseed oil present is about 5 to about 15 wt. %.

7. The ink of claim 1 wherein the amount of dibutylated benzoguanamine present is about 5 to 20 wt %.

8. The ink of claim 1 wherein the amount of p-toluene sulfonic acid present is about 1 to about 5 wt. %.

9. The ink of claim 1, wherein the amount of pigment present is about 12.5 wt. %.

10. The ink of claim 1, wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

11. A water based heat set/offset lithographic printing ink comprising:
 (a) water;
 (b) polyamide resins;
 (c) hydroxyethylethylene urea;
 (d) a modified linseed oil;
 (e) a dibutylated benzoguanamine; and
 (f) a pigment.

12. The ink of claim 11 wherein the amount of water present is about 5 to about 35 wt. %.

13. The ink of claim 11 wherein the polyamide resins are bonded to the dry pigmen a ratio of 1:1.

14. The ink of claim 13 wherein the amount of polyamide resin bonded pigment present is about 25 wt. %.

15. The ink of claim 11 wherein the amount of hydroxyethylethylene urea present is about 5 to about 30 wt. %.

16. The ink of claim 11 wherein the modified linseed oil is present in an amount of about 5 to about 15 wt. %.

17. The ink of claim 11 wherein the dibutylated benzoguanamine is present in an amount of about 5 to about 10 wt/%.

18. The ink of claim 11, wherein the pigment is present in an amount of about 12.5 wt. %.

19. The ink of claim 11, wherein the pigment is selected from the group consisting of CI Pigment Yellows 1, 3, 4, 5, 12, 13, 14, 17, 55, 65, 73, 83, 97 and 98; CI Pigment Oranges 13, 16 and 46; CI Pigment Reds 2, 3, 4, 10, 12, 48, 48:1, 48:2, 53, 57:2, 81, 104, 146, 170 and 176; CI Pigment Greens 2, 7 and 36; CI Pigment Blues 1, 15:1, 15:2, 15:3, 15:6, 16, 29, 56 and 61; CI Pigment Violets 3, 23 and 37; CI Pigment Blacks 6 and 7; and CI Pigment Whites 6, 7, 18 and 26.

* * * * *